United States Patent

[11] 3,601,521

| [72] | Inventor | Evans T. Morton |
| | | Pompano Beach, Fla. |
| [21] | Appl. No. | 38,248 |
| [22] | Filed | May 18, 1970 |
| [45] | Patented | Aug. 24, 1971 |
| [73] | Assignee | Behring Corporation |
| | | Fort Lauderdale, Fla. |

[54] UTILITY CONSTRUCTION IN MODULES
8 Claims, 7 Drawing Figs.

[52] U.S. Cl. ..................................... 174/48,
52/79
[51] Int. Cl. ..................................... H02g 3/28
[50] Field of Search ......................... 174/48, 49;
52/79, 173, 27

[56] References Cited
UNITED STATES PATENTS
| 2,247,340 | 6/1941 | Webster ...................... | 52/79 |
| 2,321,568 | 6/1943 | Wilson ....................... | 174/49 |
| 2,893,066 | 7/1959 | Perdue ....................... | 52/79 |
| 3,316,624 | 5/1967 | Brudevold .................. | 174/49 UX |
| 3,492,767 | 2/1970 | Pincus ....................... | 52/79 |

Primary Examiner—Thomas J. Kozma
Assistant Examiner—D. A. Tone
Attorney—Settle & Oltman ABSTRACT: A building module having an outside service wall with a framework is provided with an electrical meter unit recessed into the framework and available on the outside thereof for meter reading, the recessing of the meter unit into the framework preventing projection of the unit beyond dimensional limits for travel of modules on roadways. Electrical conduit is attached to the framework to provide distribution of electrical service throughout the module and to other parts of the building. At a place where two walls of adjoining modules abut each other, aligned openings are provided, and an air-conditioning duct as well as a portion of the electrical conduit passes through these aligned openings to provide air and electrical interconnection between modules.

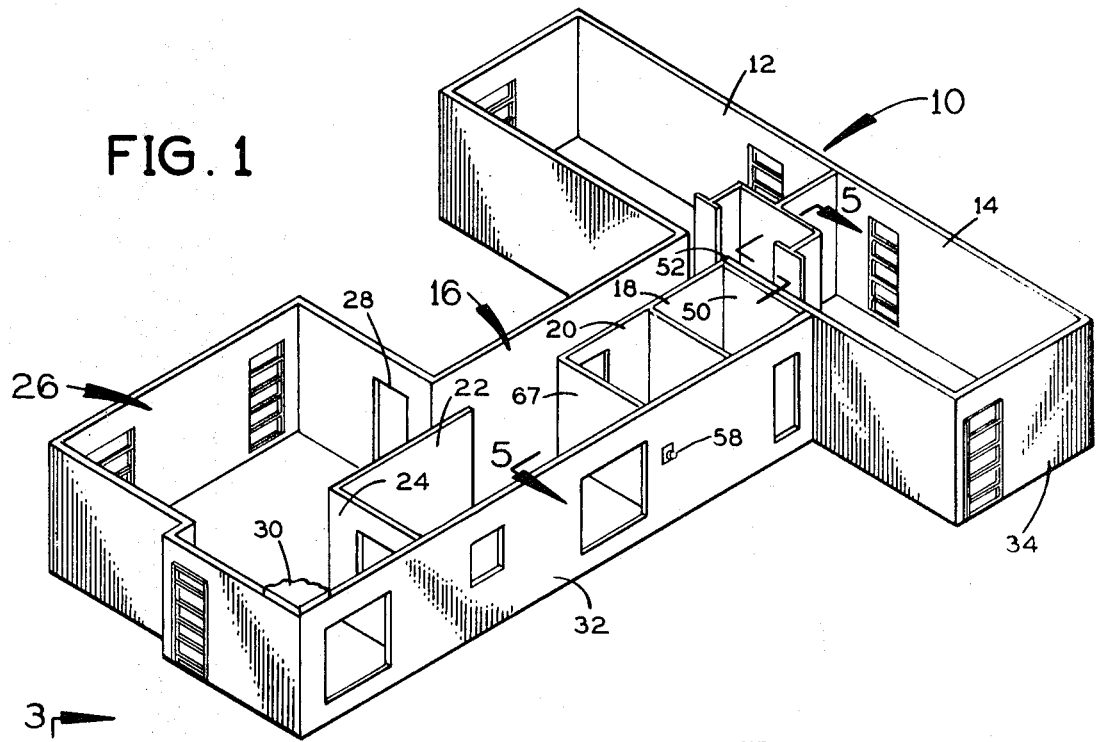
FIG. 1
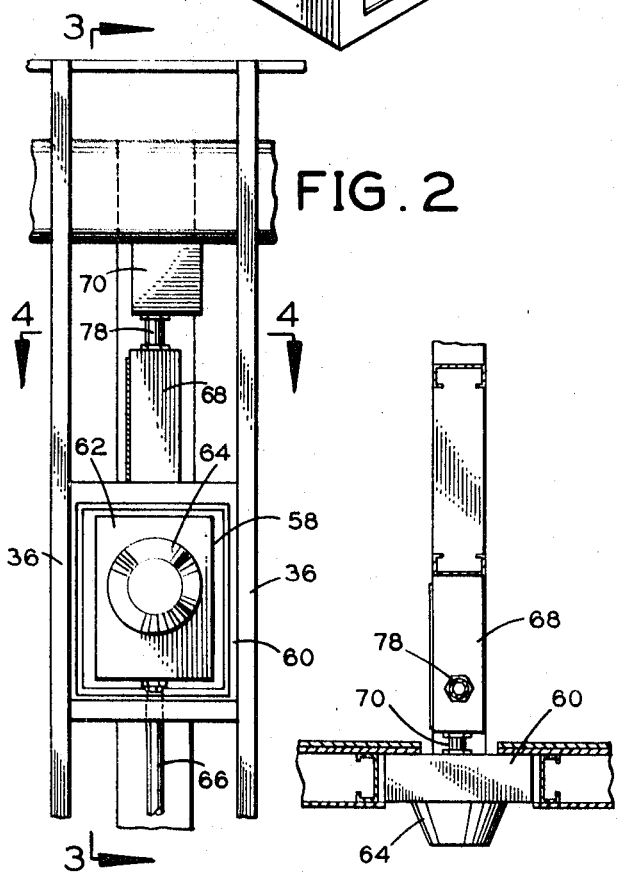
FIG. 2
FIG. 4
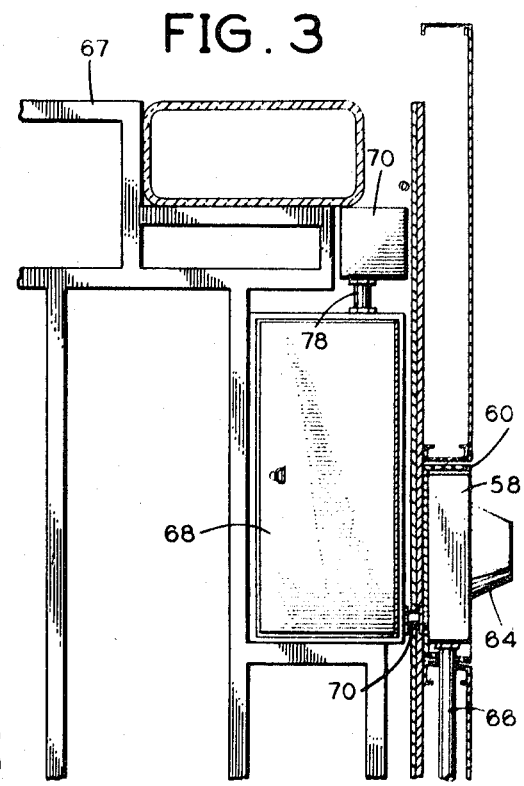
FIG. 3
INVENTOR
EVANS T. MORTON
BY
SETTLE & OLTMAN
ATTORNEYS

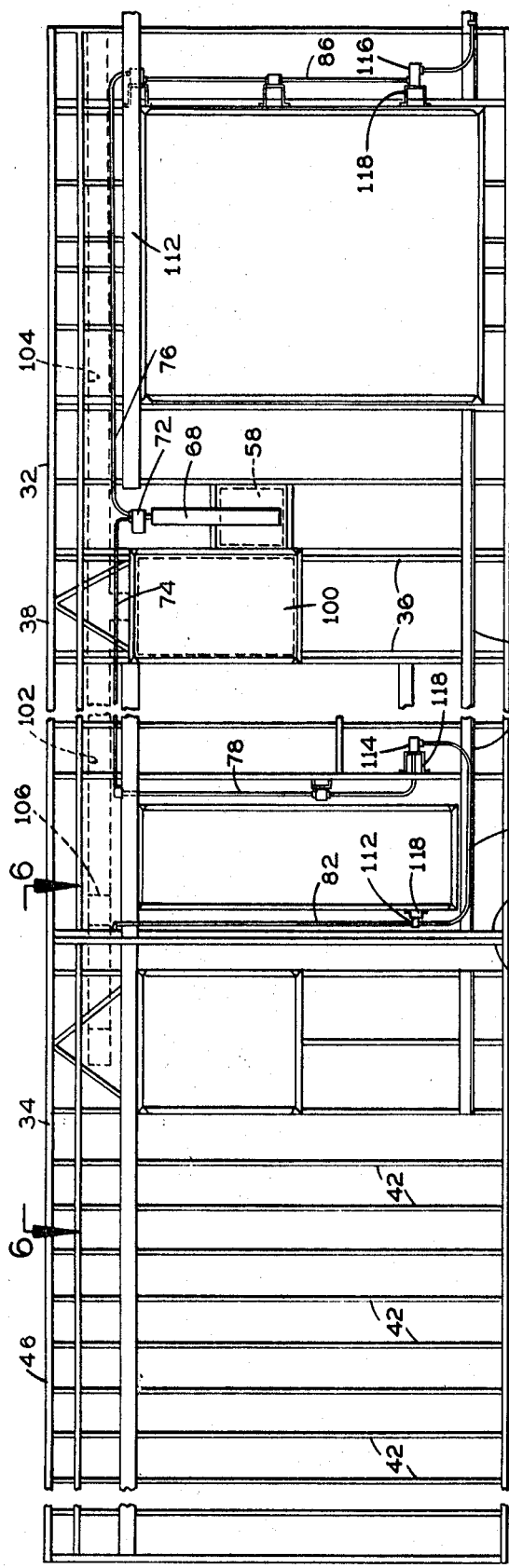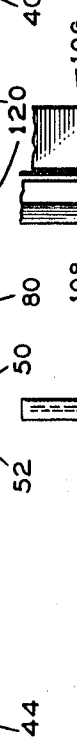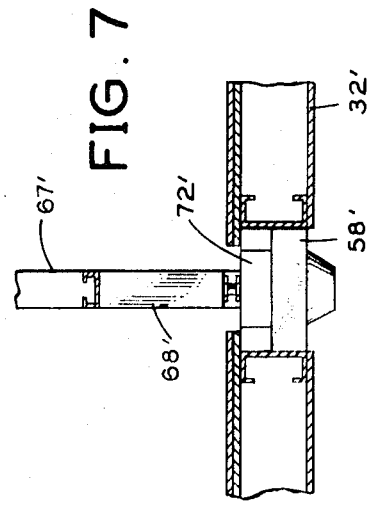

UTILITY CONSTRUCTION IN MODULES

BACKGROUND OF THE INVENTION

Modular construction of homes and other buildings offers several advantages. It is possible to construct homes with more standard elements and parts which can be prefabricated to close tolerances so that closely fitting parts are obtained. The time and labor involved in constructing a building can be reduced and can be scheduled with closer control so that overall construction costs are reduced. Modern technology can be applied more readily to the fabrication of buildings at factories than where construction is accomplished wholly on a building site.

In constructing such a modular building, complete modules or units each containing at least one room are prefabricated at the factory and then transported to the building site and assembled together into a building such as a home. Some of the advantages of such prefabrication would be lost if it is necessary to install electrical wiring, air-conditioning ducts, and other such utility services at the building site. Maximum advantage is obtained only if such utilities are incorporated into the modules at the factory. However, the utility must be incorporated in such a way that they do not create problems in transporting the modules to the homesite or in assembling the modules at the homesite.

SUMMARY OF THE INVENTION

In accordance with the present invention, the electrical system of modules for a building is prebuilt into modules by attaching electrical conduit directly to the framework of a module and connecting this conduit to an electrical meter unit which is recessed into the framework of the module and available on the outside of the module for meter reading. With this construction, a wall of a module can be constructed complete with electrical wiring attached to it and with a meter unit recessed into it, and this wall can then be assembled with other similar walls in a mass production assembly operation to achieve maximum economies in construction. The recessing of the meter unit into the framework of the wall prevents the electrical meter unit from projecting beyond the outside of the wall excessively and thus keeps the outside dimensions of the module within dimensional limits established for travel of modules on roadways. Such modules are ordinarily transported to the building site on trucks, and there can be no projections beyond the load limits for such trucking operations. An air-conditioning system is also installed in the module at the factory, and this system includes a duct which runs above ceiling level in the module. At a double wall where two modules abut each other in the assembled building, aligned openings are provided, and the air-conditioning duct and electrical conduit pass through these aligned openings to provide interconnection between modules in the completed building. Thus, the utility construction lends itself to substantially complete prefabrication of modules complete with utilities while allowing easy assembly of modules at the building site.

Accordingly, it is an object of the present invention to provide modules for modular homes or other buildings with preinstalled utilities.

Another object of the invention is to provide an electrical system in a building module with a recessed meter unit which does not project outside the module beyond dimensional limits for the module imposed by roadway restrictions.

Another object of the invention is to provide modules in which electrical conduit is preattached to a wall of the module along with an electrical meter unit so that the wall, conduit and meter unit form a subassembly which can be assembled with other walls, floor and roofing frames to provide a complete module.

A further object of the invention is to provide such a module with air-conditioning ducts which, along with the electrical conduit, can be interconnected between modules in a simple and direct fashion.

Other objects of this invention will appear from the following description and appended claims, reference being had to the accompanying drawings forming a part of this specification wherein like reference characters designate corresponding parts in the several views.

ON THE DRAWINGS

FIG. 1 is a perspective view, somewhat schematic, showing the layout of a modular home;

FIG. 2 is an elevational view of a portion of a framework of one wall of a building of FIG. 1 showing a meter unit, a panel unit and a pull box incorporated into the framework of the module;

FIG. 3 is a sectional view taken along line 3—3 of FIG. 2;

FIG. 4 is a sectional view taken along line 4—4 of FIG. 2 and looking down in the direction of the arrows;

FIG. 5 shows the wall construction of walls in two modules of a building, and in particular shows how electrical conduit and air-conditioning ducts are assembled relative to the walls;

FIG. 6 is a plan view of a portion of the walls of FIG. 5; and

FIG. 7 is a fragmentary cross-sectional view similar to FIG. 4, but showing a somewhat modified construction.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

AS SHOWN ON THE DRAWINGS

A layout of a modular home is shown in perspective in FIG. 1. This home has three modules: (1) a bedroom module 10 which contains two bedrooms 12 and 14, (2) a so-called "-wet" module 16 (so named because all plumbing is located in this module) containing bathrooms at 18, utility space at 20, kitchen space at 22, and dining space at 24, and (3) a living room module 26 which has a front door at 28. Each module is prefabricated at a factory, and the modules are transported to a building site where they are assembled together according to the pattern shown in FIG. 1 to form a complete home. Each module is formed by a plurality of wall frames having inner and outer wall surfacing, a floor frame and a roof frame, with only a portion 30 of a roof frame being visible in FIG. 1 since the roof has been omitted to reveal the interior construction.

FIG. 5 shows portions of a service wall 32 of the wet module and a backwall 34 of the bedroom module 10. These walls are shown at a stage of construction before wall surface panels such as gypsum board have been applied to the walls so as to reveal the construction of the wall frames. It may be seen that wall 32 has a framework made up of vertical metal studs such as 36 supported at top and bottom by runners 38 and 40. The framework of wall 34 also includes vertical metal studs such as 42 supported at top and bottom by horizontal runners 44 and 46. Both the vertical studs 36 and 42 and the runners 38, 40, 44 and 46 may be metal channel members, and all of these members are preferably secured together by welding. Located between and perpendicular to the walls 32 and 34 are interior walls 50 and 52. Wall 50 is the end wall of wet module 16, and wall 52 is a part of bedroom module 10. These two walls are placed in abutting relation when the modules are assembled. It may be noted at this point that walls 50 and 52 have aligned openings 54 and 56 allowing for passage of air and electrical interconnections in the manner shown in FIG. 6 as will be described further.

Referring now to FIGS. 2–6 inclusive, it may be seen that an electrical meter unit 58 is mounted within the framework of the service wall 32 of wet module 16. The electrical meter unit 58 is mounted in a box 60 that is open at one side and closed on all other sides and that is welded or otherwise secured to two of the vertical studs 36. The electrical meter unit 58 contains an electrical meter which is supplied by a utility company and has a door 62 with a projection 64 thereon, the door and projection being available on the outside of the wall 32 so that the door can be opened to provide access to the interior meter for meter-reading purposes. The main portion of the meter unit 58 is located entirely within the lateral limits of the framework of wall 32, and only the projection 64 juts out from the outside of wall 32. The reason for recessing the meter unit into the framework of wall 32 in this manner is to prevent the meter unit from exceeding dimensional limits on the width of the wet module 16. The module can be only 12 feet wide because this is the widest load which can be transported on a truck over roadways presently existing. Thus, the meter unit 58 cannot project beyond the 12-foot limitation, and yet it is desired to make the width of the module itself as great as possible. Therefore, the body of the meter unit 58 is recessed into the framework of wall 32. Electrical connections from the meter inside unit 58 to external electrical service are made via conduit 66.

Mounted in an internal wall 67 (FIG. 1) directly behind the meter unit 58 is a circuit panel box 68. Electrical connections are made between the circuit panel box 68 and the meter unit 58 by conduit 70. Circuit breakers and wiring are provided inside the circuit panel box 68 in a manner which forms no part of the present invention and therefore is not illustrated. Above the circuit panel box 68, there is a pull box 72 to which conduits such as 74 and 76 (FIG. 5) are connected. When wires are run through the conduits 74 and 76, they enter the pull box 72 where a workman may reach them for the purpose of making electrical connections to the circuitry inside circuit panel box 68. Pull box 72 is connected to panel box 68 through conduit 78.

The conduits 74 and 76 as well as related conduits 78, 80, 82, 84 and 86 are attached to the stud member 36 of the framework of wall 32. This attachment of the electrical conduit to the stud members of the wall framework can be done while the wall 32 is being built. The electrical meter unit 58 may also be installed in the wall 32 while the wall is being built. Thus, the wall 32, the electrical conduit having a meter unit 58 form a subassembly which can be assembled with other walls to construct a complete module such as the wet module 16. This offers labor and material advantages as compared to the alternative of first assembling the walls, floor and roof of a module and then installing the electrical conduit and other items.

Section 84 of the electrical conduit (FIG. 6) runs along wall 50 and terminates at a flexible cable 88 which may be passed through the openings 54 and 56 in walls 50 and 52 after the modules 16 and 10 have been assembled at the building site. On the other side of wall 52, the flexible cable 88 connects to conduit sections 90 and 92 which distribute electrical service to the bedrooms 12 and 14 via conduit sections 94 and 96 for example.

Mounted in wet module 16 preferably attached to the framework of wall 32 is an air conditioner unit 100. Air ducts 102 and 104 are connected to the air conditioning unit 100, and it may be seen that air duct 102 runs to a cross duct section 106 which in turn connects with a connector duct section 108 which passes through aligned openings 54 and 56 in the walls 50 and 52 to provide air interconnection between the modules 16 and 10. On the other side of wall 52, the connector duct 108 connects with another duct 110 which distributes air to the bedrooms 12 and 14. The ducts just referred to are located above ceiling level which is at strip 112 in FIG. 5, so the ducts are completely hidden in the completed home. Portions of the electrical conduit are also located above ceiling level and the interconnections 88 and 108 in particular are located above ceiling level and so are not visible inside the home. The connections 88 and 108 together with connections between modules 16 and 26 are about the only air and electrical connections which must be made after the modules are assembled.

Referring again to FIG. 5, it may be seen that the vertical conduit sections 78, 82 and 86 have junction boxes such as 112, 114 and 116 and these junction boxes are affixed to metal brackets 118 which are in turn welded to one of the vertical studs 36. The horizontal sections of electrical conduit may be welded directly to the metal studs except that the lower sections such as 80 are welded to an angle member 120 which is attached to the framework of wall 32 and is provided at floor level.

It may be noted that the circuit panel unit 68 and the pull box 72 may be attached directly to the wall 32 rather than to the interior wall 68 is desired, or the arrangement shown in FIG. 7 may be used wherein the pull box 72' and the meter unit 58' are both recessed in the wall 32' and the circuit panel unit 68' is provided in the interior wall 67' which corresponds to wall 67 in FIG. 1. In this case electrical connections are wired from the meter unit 58' to the pull box 72' when the wall 32' is built, and when wall 32' is later assembled with wall 67' electrical connections can be pulled and wired together at the pull box 72' from the circuit panel unit 68'.

It is thus apparent that the invention provides a construction for electrical and air utilities inside a module building which maximizes the amount of prefabrication which can be done in a factory. The electrical conduit, and the electrical meter unit can be built into the wall while it is being fabricated to provide a wall and electrical subassembly which can later be assembled with other walls in the fabrication of a module. The meter unit is recessed to prevent it from projecting outside the module beyond dimensional limits for the width of the module. Air and electrical interconnections between modules are made after the modules are assembled together in the manner described in connection with FIG. 6. Similar interconnections are made between module 16 and module 26 except that no walls are provided between these modules so connections are simplified.

Having thus described my invention, I claim:

1. In a module for a building having an outside service wall with a framework comprised of metal studs and means supporting the studs, the improvement of an electrical meter unit recessed into said framework and available on the outside thereof for meter reading, the recessing of the meter unit into the framework preventing projection thereof beyond dimensional limits for travel of modules on roadways.

2. In a modular building having at least two prefabricated modules each containing at least one room and assembled together as units of the building, the improvement wherein at least one of said modules has an outside service wall including a framework, electrical conduit attached to said framework and providing distribution of electrical service, and an electrical meter unit recessed into said framework and available outside said framework for meter reading, said meter unit being recessed into said framework to an extent preventing projection thereof beyond dimensional limits for travel of modules on roadways.

3. The combination as claimed in claim 2 in which said framework, said electrical conduit and said meter unit comprise a prefabricated subassembly.

4. In a modular building having second and third walls to supply least two prefabricated modules each containing at least one room and assembled together as units of the building, the combination of a first module having walls including an outside service wall where utility service is concentrated and a second wall adjoining another module, a second module having walls including a third wall adjoining said second wall and parallel thereto, said service wall having framework to which electrical conduit is affixed including a portion passing through aligned openings in said second and third walls to supply electrical service to said second module, an electrical meter unit recessed into said service wall and available outside said first module for reading, and a circuit panel connected electrically to said meter unit and supported adjacent thereto providing circuit control, said meter unit including a portion within said framework and a portion available outside said service wall but not projecting from the same beyond dimensional limits for travel of modules on roadways.

5. The combination claimed in claim 4 further including airconditioning means in said first module having ducts with a duct portion passing through said openings in said second and third walls to supply air to said second module.

6. The combination as claimed in claim 5 in which said ducts and portions of said electrical conduit including those portions passing through said openings are located above ceiling level.

7. The combination as claimed in claim 4 in which said service wall with said electrical conduit affixed thereto is a subassembly of said first module.

8. In a modular building having at least two prefabricated modules each containing at least one room and assembled together as units of the building, the combination of a first module having roof, floor and wall frames, said wall frames including an outside service wall frame and an interior wall frame perpendicular to said service wall frame at one end thereof, a second module having roof, floor and wall frames including a third wall frame adjoining and parallel to said second wall frame, said second and third wall frames having means defining aligned openings therein for passage of conduit and a duct, electrical conduit affixed to said service wall frame and providing electrical service in said building, said conduit including a portion located above ceiling level in said modules passing through said openings to provide interconnection between modules, air conditioning means including a duct suspended from said roof frame and passing through said openings to provide interconnection between modules, said conduit and said service wall frame constituting a subassembly of said first module, and an electrical meter unit affixed to said service wall frame and available outside the same for meter reading.